(12) United States Patent
Chong et al.

(10) Patent No.: US 6,804,619 B1
(45) Date of Patent: Oct. 12, 2004

(54) PROCESS CONTROL BASED ON TOOL HEALTH DATA

(75) Inventors: Robert J. Chong, Austin, TX (US); Eric O. Green, Austin, TX (US); Jin Wang, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 21 days.

(21) Appl. No.: 10/231,910

(22) Filed: Aug. 30, 2002

(51) Int. Cl.$^7$ ................................................ G06F 19/00
(52) U.S. Cl. .................... 702/84; 702/34; 702/179; 700/108; 700/121
(58) Field of Search ........................ 702/81, 82, 34–36, 702/179; 700/100, 177, 44, 95, 108, 121, 174; 438/10, 17, 518, 522

(56) References Cited

U.S. PATENT DOCUMENTS 6,268,270 B1 * 7/2001 Scheid et al. ............... 438/522
6,594,589 B1 * 7/2003 Coss et al. .................... 702/34
6,622,059 B1 * 9/2003 Toprac et al. ............... 700/121
6,721,616 B1 * 4/2004 Ryskoski .................... 700/108

* cited by examiner

Primary Examiner—Bryan Bui
(74) Attorney, Agent, or Firm—Williams, Morgan & Amerson, P.C.

(57) ABSTRACT

A method is provided for a process control based on tool health data. The method comprises processing a workpiece using a processing tool, receiving trace data associated with the processing of the workpiece from the processing tool and determining at least one value associated with a health of a portion of the processing tool based on at least a portion of the received trace data. The method further comprises adjusting processing of another workpiece based on the determined health value.

24 Claims, 3 Drawing Sheets

PROCESS CONTROL BASED ON TOOL HEALTH DATA

BACKGROUND OF THE INVENTION

1. Field of the Invention

This invention relates generally to a semiconductor fabrication process, and, more particularly, to controlling the semiconductor fabrication process based on tool health data provided by a fault detection and classification unit.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial improvements.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an Advanced Process Control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, particle contamination, film optical properties, film thickness, film uniformity, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology data to attempt to achieve post-processing results as close to a target value as possible. Reducing variation in this manner leads to increased throughput, reduced cost, higher device performance, etc., all of which equate to increased profitability.

As noted, metrology data is one way of controlling process variations. While reliance on the metrology data for process control is generally effective, such data typically only provides information associated with measurements of the processed wafers, information such as critical dimensions and doping levels. Thus, the ability to control process variations may be somewhat limited if the process control is based primarily on the underlying metrology data that is provided to the controller.

The present invention is directed to overcoming, or at least reducing the effects of, one or more of the problems set forth above.

SUMMARY OF THE INVENTION

In one embodiment of the present invention, a method is provided for a process control based on tool health data. The method comprises processing a workpiece using a processing tool, receiving trace data associated with the processing of the workpiece from the processing tool and determining at least one value associated with a health of a portion of the processing tool based on at least a portion of the received trace data. The method further comprises adjusting processing of another workpiece based on the determined health value.

In another embodiment of the present invention, an apparatus is provided for a process control based on tool health data. The apparatus comprises an interface and a controller that is communicatively coupled to the interface. The interface is adapted to receive trace data associated with processing a semiconductor wafer of a lot. The controller is adapted to determine health data associated with one or more components of the processing tool based on at least a portion of the received trace data and adjust processing of another semiconductor wafer in the lot based on the determined health data.

In a further embodiment of the present invention, an article comprising one or more machine-readable storage media containing instructions is provided for process control based on tool health data. The one or more instructions, when executed, enable the processor to receive trace data associated with processing of a wafer by a processing tool, generate one or more health statistics associated with the operation of the processing tool based on at least a portion of the received trace data and provide at least one of the health statistic to a controller to adjust one or more parameters of the recipe based on the at least one health statistic.

In a further embodiment of the present invention, a system is provided for process control based on tool health data. The system comprises a processing tool, a fault detection and classification system and a controller. The processing tool is adapted to provide trace data associated with the processing of a wafer of a lot. The fault detection and classification system is adapted to determine one or more health statistics associated with the health of a processing tool based on at least a portion of the trace data and provide the one or more health statistics to a controller. The controller is provided for controlling the processing of the processing tool. The controller is adapted to adjust the processing of a next wafer of the lot based on at least one of the health statistics.

BRIEF DESCRIPTION OF THE DRAWINGS

The invention may be understood by reference to the following description taken in conjunction with the accompanying drawings, in which like reference numerals identify like elements, and in which.

Figure 1:
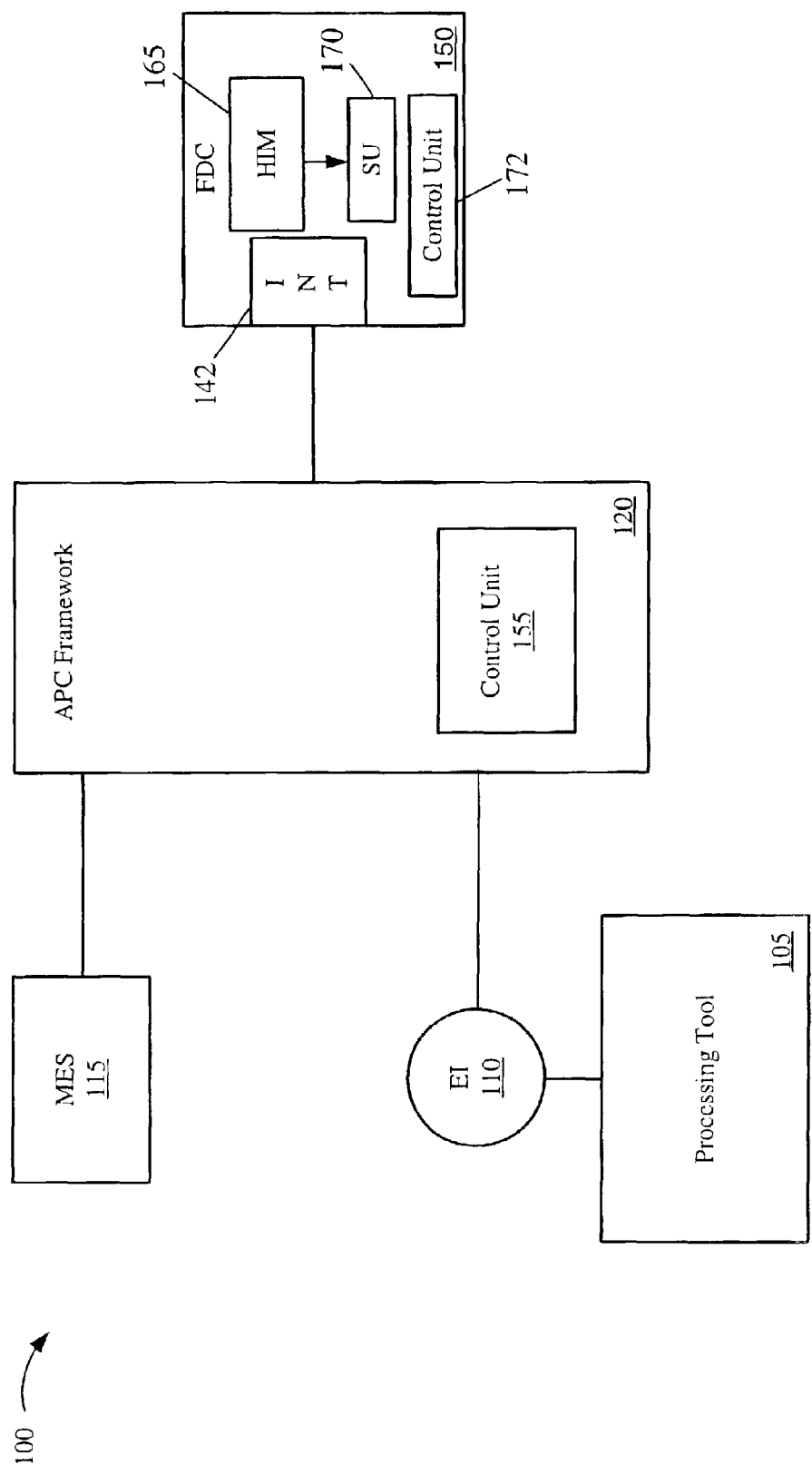
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a manufacturing system 100 for performing a semiconductor fabrication process is provided. The manufacturing system 100 includes a processing tool 105, which in the illustrated embodiment is coupled to an Advanced Process Control (APC) framework 120 through an equipment interface (EI) 110.

The manufacturing system 100 may include a manufacturing execution system (MES) 115 that is coupled to the APC frame work 120. The APC framework 120 includes a process control unit 155 that, through a feedback process, aids the processing tool 105 towards performing a desired process in the tool to thereby achieve a desired result. The manufacturing system 100, in the illustrated embodiment, also includes a fault detection and classification (FDC) unit 150 that is coupled to the APC framework 120 via an interface 142. The interface 142 may be any acceptable structure(s) that allow(s) the FDC unit 150 to communicate with other devices. The FDC unit 150 may include a health indicator module (HIM) 165 that is storable in a storage unit (SU) 170. The FDC unit 150 includes a control unit 172 for managing the overall operations and executing one or more software applications resident in the storage unit 170.

As described in more detail below, in accordance with one or more embodiments of the present invention, the FDC unit 150 and the control unit 155 operate cooperatively to control the processing of the processing tool 105. In one embodiment, as illustrated in greater detail below, the FDC unit 150 calculates health statistic(s) regarding one or more components of the processing tool 105 and provides the health statistic(s) to the process control unit 155, which then adjusts the processing of the processing tool 105 based on the health statistic(s).

The processing tool 105 in the illustrated embodiment may take the form of any semiconductor fabrication equipment used to produce a processing piece, such as a silicon wafer. The techniques described herein may be applied to a variety of integrated circuit products including, but not limited to, microprocessors, memory devices, digital signal processors, application specific integrated circuits (ASICs), or other similar devices. An exemplary processing tool 105 may include an exposure tool, etch tool, deposition tool, polishing tool, rapid thermal processing tool, test-equipment tool, implantation tool, packaging tool and the like. It should be appreciated that the processing tool 105 need not necessarily be limited to processing silicon wafers, but may produce a variety of different types of commercial products without departing from the spirit and scope of the present invention. Additionally, although FIG. 1 illustrates only one processing tool 105, it should be appreciated that the manufacturing system 100 may employ a plurality of processing tools 105, depending on the implementation goals or objectives.

As mentioned, in the illustrated embodiment, the processing tool 105 is coupled to the equipment interface (EI) 110, which interfaces the processing tool 105 to the manufacturing execution system 115. The manufacturing execution system 115 manages and controls the overall operation of the processing tool 105. For example, the manufacturing execution system 115 may determine what processes are to be performed by the processing tool 105, when these processes are to be performed, how these processes are to be performed, etc. In the illustrated embodiment, the manufacturing execution system 115 manages and controls the overall system through the APC framework 120.

An exemplary APC framework 120 that may be suitable for use in the manufacturing system 100 may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The control unit 155 calculates new recipe parameters based in part on the information (e.g., tool health data or health statistics) provided by the FDC unit 150. The new recipe parameters aid the processing tools 105 towards performing a desired process in the processing tools 105 to thereby achieve a desired result.

The FDC unit 150 is adapted to detect and classify faults associated with the processing tool 105. Faults may occur in a manufacturing process for various reasons, including occurrence of an unknown disturbance, hardware failure, depletion of resources (e.g., gases, liquids, chemicals), and the like. The faults may be detected in several ways, including based on data provided by the processing tool 105. The FDC unit 150, for example, may also detect a fault based on comparing the received operational data from the processing tool 105 to fault model data. The fault model data includes operational data of other similar-type tools, where it was previously known that such tools had operated within acceptable operational limits. Once the fault is detected, the FDC unit 150 may determine one or more possible causes of the detected fault, a process sometimes also referred to as "classification."

As indicated in the depicted embodiment, the FDC unit 150 includes the health indication module 165. The health indication module 165 in the illustrated embodiment is implemented in software, and, as such, is stored in the storage unit 170 of the FDC unit 150. In other embodiments, the health indication module 165 may be implemented in hardware or firmware. For illustrative purposes, the health indication module 165 is shown resident in the FDC unit 150, although it should be noted that the health indication module 165 may be implemented in any suitable component of the manufacturing system 100, including in the control unit 155. In one embodiment, the health indication module 165 may be implemented in a standalone unit, such as a data processing unit or computer.

It should be understood that the illustrated components shown in the block diagram of the system 100 in FIG. 1 are illustrative only, and that, in alternative embodiments, additional or fewer components may be utilized without deviating from the spirit or scope of the invention. For example, in one embodiment, the MES 115 may interface with the APC framework 120 through an associated equipment interface. Additionally, it should be noted that although various components, such as the equipment interface 110 of the system 100 of FIG. 1 are shown as stand-alone components, in alternative embodiments, such components may be integrated into the processing tool 105. Similarly, the FDC unit 150 may be integrated into the APC framework 120. Additionally, the storage unit 170 of the FDC unit 150 may be located at any suitable location in the manufacturing system 100 such that various components of the manufacturing system 100 can access the contents stored therein.

Figure 2:
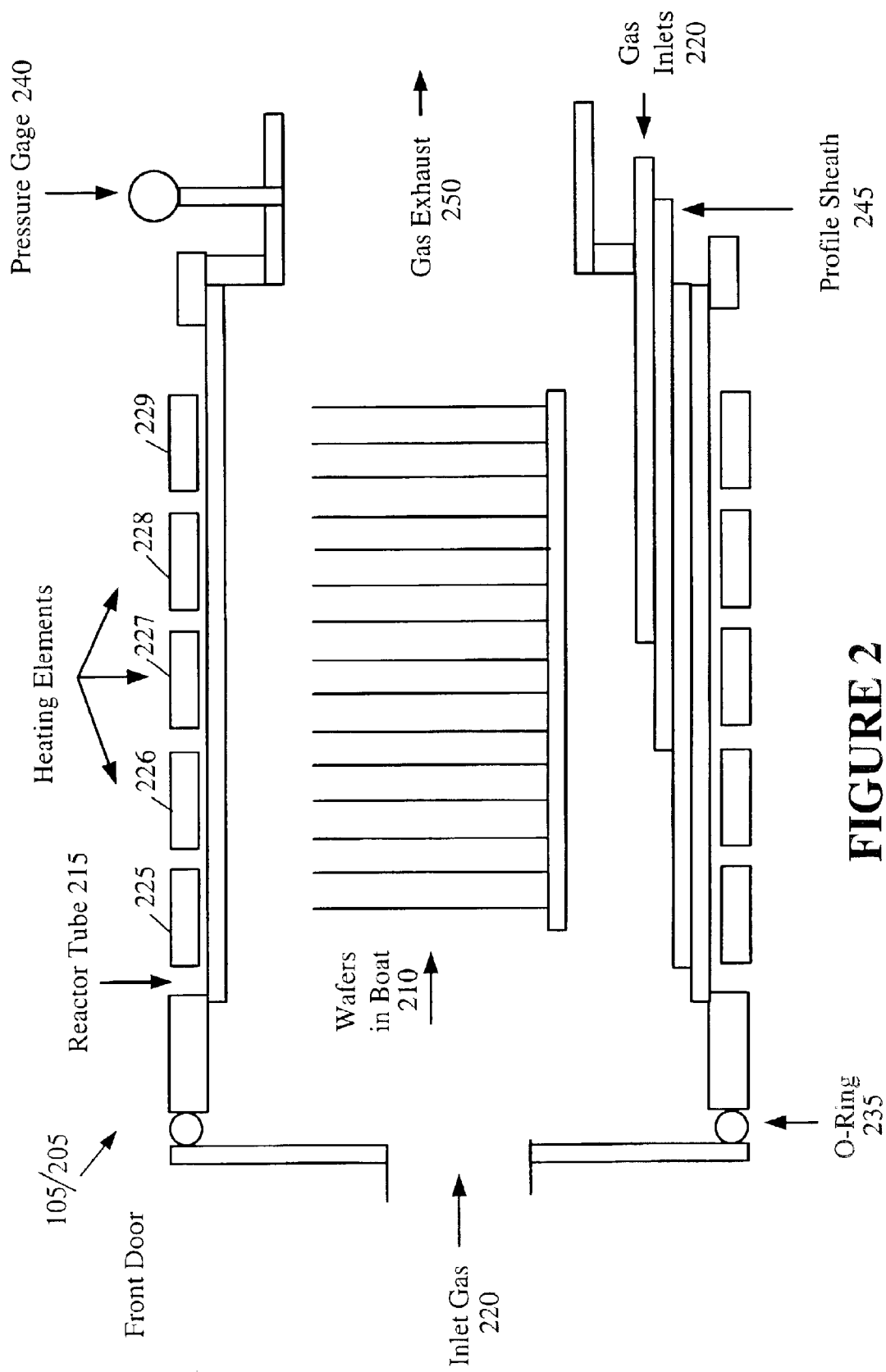
FIG. 2 depicts a stylistic block diagram of an exemplary processing tool that may be employed in the manufacturing system of FIG. 1, in accordance with one embodiment of the present invention.
Figure 3:
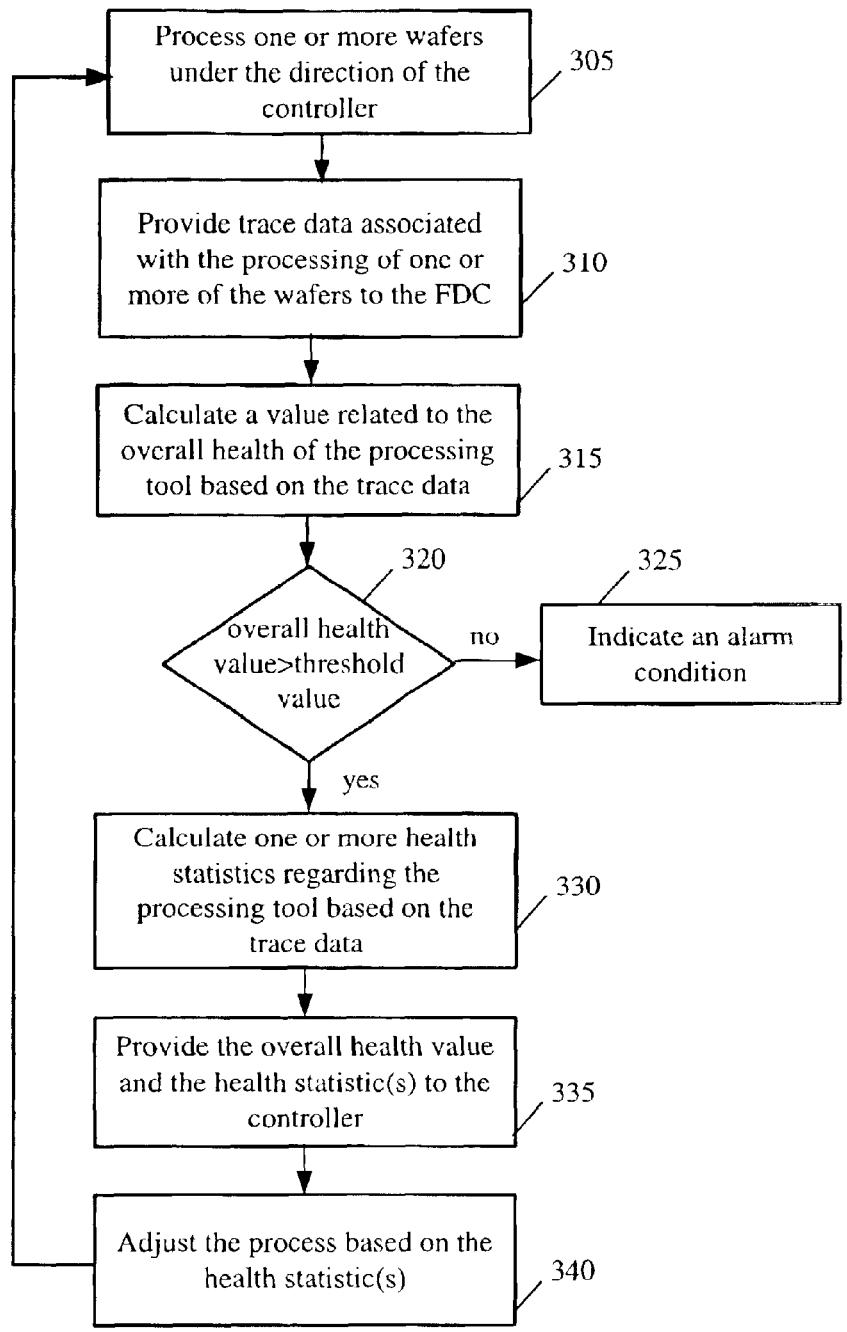
FIG. 3 illustrates a flow diagram of a method that may be implemented in the manufacturing system of FIG. 1, in accordance with one embodiment of the present invention.

Referring now to FIGS. 2 and 3, a block diagram of an exemplary processing tool 105 and a flow diagram of a method that may be implemented in the manufacturing system 100 of FIG. 1 is illustrated, in accordance with one embodiment of the present invention. For ease of illustration, the method of FIG. 3 is described in the context of the processing tool 105 of FIG. 2, which in the illustrated embodiment is a Low Pressure Chemical Vapor Deposition (LPCVD) Furnace 205. The general operation of the LPCVD 205 of FIG. 2 is described first, and the method of FIG. 3 is described thereafter. It should be understood that the LPCVD furnace 205 is provided only as an example, and that one or more embodiments of the present invention are applicable to a variety of other tools.

In the LPCVD furnace 205, the semiconductor wafers 210 are placed perpendicular to the main direction of gas flow and inside a reactor tube 215. As chemical reagents (e.g., gas) are injected through one or more inlets 220, chemical reactions occur that cause thin films, for example, to be deposited on the surfaces of the semiconductor wafers 210. The surfaces of the semiconductor wafers 210 are heated by five independently controlled heating elements 225–229 of the LPCVD furnace 205 in the illustrated embodiment. The LPCVD furnace 205 may also include an O-ring 235, pressure gauge 240, profile sheath 245, and gas exhaust 250.

The uniformity and rate of deposition are some of the factors that may affect the operation of the LPCVD furnace 205. For successful operation, two control objectives that are commonly monitored are the target deposition thickness and wafer-to-wafer uniformity, which may be affected by an insufficient power input level to the heating elements 225–229, inadequate reactant concentrations (molar fraction of different components), low gas flow rate and pressure, and the like.

As indicated in FIG. 3, the LPCVD furnace 205 processes (at 305) one or more wafers 210 under the direction of the control unit 155. The LPCVD furnace 205, in one embodiment, may process a group (i.e., "lot") of wafers 210. As the LPCVD furnace 205 processes (at 305) the one or more wafers 210, trace data associated with the LPCVD furnace 205 (or associated with the processing of the wafers 210) is provided (at 310) to the FDC unit 150. In one embodiment, the trace data is provided (at 310) to the FDC unit 150 in substantially real time. The type of trace data provided to the FDC unit 150 may naturally vary with the particular type of processing tool 105 that is employed. For example, the LPCVD furnace 205 may provide the FDC unit 150 with trace data that includes gas flow rates, chamber pressure, chamber temperature, processing time, operating condition of the heating elements 225–229, and operating conditions of other various components of the LPCVD furnace 205. As an additional example, a polishing tool may provide the FDC unit 150 with trace data that includes polish time, downforce, polishing pad speed, motor current, polishing arm oscillation magnitude and frequency, slurry chemical composition, temperature inside the tool, and operating conditions of various components of the polishing tool. Similarly, in other embodiments, a variety of other types of trace data may be provided to by the FDC unit 150.

Based on the trace data provided (at 310), the FDC unit 150 calculates (at 315) an overall health value associated with the LPCVD furnace 205. The overall health value is a general indication of the health of the processing tool 105, which, in the illustrated example, is the LPCVD furnace 205. A relatively low overall health value may, for example, indicate that the LPCVD furnace 205 is experiencing faulty operation. On the other hand, a relatively high overall health value may be an indication that the LPCVD furnace 205 is operating as desired.

The FDC unit 150 determines (at 320) if the overall health value is greater than a pre-selected threshold value, where the threshold value, for example, represents a minimum confidence level that is needed for the operation of the LPCVD furnace 205 to continue. As explained below, in one embodiment, the act of determining if the overall health value is greater than the pre-selected threshold value (at 320) may be performed by the control unit 155 instead of the FDC unit 150.

If it is determined (at 320) that the overall health value is less than the threshold value, then the FDC unit 150 provides (at 325) an alarm condition notifying a fab technician that the LPCVD furnace 205 needs servicing. In one embodiment, the FDC unit 150 may indicate to the control unit 155 to stop the processing altogether until the alarm condition has been addressed.

If it is determined (at 320) that the overall health value is greater than the threshold value (an indication that the LPCVD furnace 205 is operating above a minimum confidence level), the FDC unit 150 calculates (at 330) one or more health statistics regarding one or more components of the LPCVD furnace 205 based on the trace data. For example, based on the trace data, the FDC unit 150 may determine that the second heating element 226 of the LPCVD furnace 205 is not performing at the expected level or that one of the gas inlets 220 is partially (or completely) blocked. Other health statistics that may be determined by the FDC unit 150 include the level of power supplied to selected components of the LPCVD furnace 205, the temperature and pressure level inside the chambers of the LPCVD furnace 205. Those skilled in the art will appreciate that the particular health statistics that are determined by the FDC unit 150 may vary according to the type of the processing tool 105.

The FDC unit 150, in one embodiment, provides (at 335) the calculated overall health value and the health statistic(s) to the control unit 155. In one embodiment, instead of the FDC unit 150, the control unit 155 may determine (at 320) if the overall health value is above the pre-selected threshold value. Thus, if the control unit 155 determines that the LPCVD furnace 205 is not operating above the confidence level, the control unit 155, in one embodiment, indicates (at 325) the alarm condition. It should be appreciated that if the FDC unit 150 (as opposed to the control unit 155) determines whether the overall health value is above the pre-selected threshold value, then the FDC unit 150 may not need to provide the overall health value to the control unit 155.

The control unit 155 adjusts (at 340) the process performed by the LPCVD furnace 205 based on one or more of the health statistics provided by the FDC unit 150. One way the control unit 155 may adjust the process (at 340) based on the health statistic(s) is by calculating new recipe parameters to aid the processing tool 105 in moving toward a desired result (or target). The particular adjustments made to the process may vary according to the nature of deficiency in the process or processing tool 105. As an example, if the health statistics reveal that the second heating element 226 of the LPCVD furnace 205 is not being supplied adequate power, and, hence, the heating element 226 is performing at less than optimal capability, the control unit 155 may adjust the process (at 340) by compensating for the deficiency. One way of compensating for the underperforming heating element 226 may be to increase the power levels of the adjacent heating elements (e.g., the first and third heating elements 225, 227) of the LPCVD furnace 205. As an additional example, if the health statistics indicate that the temperature within a chamber is low, the control unit 155 may adjust the pressure or the power levels in the chamber of the LPCVD furnace 205 instead of the temperature level, particularly if adjusting the temperature level may compromise the process. Similarly, depending on the particular process and the deficiencies associated with that process, the control unit 155 adjusts (at 340) the process accordingly to compensate for the detected deficiencies.

In accordance with one or more embodiments of the present invention, the tool health data provided by the FDC unit 150 may be used by the control unit 155 to control the processing of the processing tool 105. This allows the control unit 155 an added flexibility to control the process based on data associated with the health of one or more components of the processing tool 105. In one embodiment, the control unit 155 may adjust the control process based on the tool health data as well as metrology data.

The various system layers, routines, or modules may be executable by the control unit 155, 172 (see FIG. 1). As utilized herein, the term "control unit" may include a microprocessor, a microcontroller, a digital signal processor, a processor card (including one or more microprocessors or controllers), or other control or computing devices. The storage unit 170 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   processing a workpiece using a processing tool;
   receiving trace data associated with the processing of the workpiece from the processing tool;
   determining at least one value associated with a health of a portion of the processing tool based on at least a portion of the received trace data; and
   adjusting processing of another workpiece based on the determined health value.

2. The method of claim 1, wherein processing the workpiece comprises processing a semiconductor wafer.

3. The method of claim 2, wherein adjusting the processing of another semiconductor wafer comprises adjusting one or more recipe parameters based on the determined health value.

4. The method of claim 2, further comprising determining a value associated with the overall health of the processing tool.

5. The method of claim 4, further comprising determining if the value associated with the overall health of the processing tool is greater than a pre-selected threshold value.

6. The method of claim 5, wherein adjusting the processing of another semiconductor wafer comprises adjusting the processing based on determining that the overall health of the processing tool is greater than the pre-selected threshold value.

7. The method of claim 4, wherein determining the at least one value associated with the health of the processing tool comprises determining an operational condition associated with one or more components of the processing tool.

8. An apparatus, comprising:
   an interface adapted to receive trace data associated with processing a semiconductor wafer of a lot; and
   a controller communicatively coupled to the interface, the controller adapted to:
   determine health data associated with one or more components of the processing tool based on at least a portion of the received trace data; and
   adjust processing of another semiconductor wafer in the lot based on the determined health data.

9. The apparatus of claim 8, wherein the controller is adapted to adjust one or more recipe parameters based on the determined health data.

10. The apparatus of claim 9, wherein the controller is adapted to determine a value associated with the overall health of the processing tool.

11. The apparatus of claim 10, wherein the controller is adapted to determining if the value associated with the overall heath of the processing tool is greater than a pre-selected threshold value.

12. The apparatus of claim 11, wherein the controller is adapted to adjust the processing based on determining that the overall health of the processing tool is greater than the pre-selected threshold value.

13. The apparatus of claim 8, wherein the controller is adapted to determine the health data associated with the health of a plurality of components of a deposition tool.

14. The apparatus of claim 8, wherein the health data comprises at least one of a temperature, power, and pressure level within a chamber of the processing tool.

15. An apparatus, comprising:
means for processing a workpiece using a processing tool;
means for receiving trace data associated with the processing of the workpiece from the processing tool;
means for determining at least one value associated with a health of a portion of the processing tool based on at least a portion of the received trace data; and
means for adjusting processing of another workpiece based on the determined health value.

16. An article comprising one or more machine-readable storage media containing instructions that when executed enable a processor to:
receive trace data associated with processing of a wafer by a processing tool;
generate one or more health statistics associated with the operation of the processing tool based on at least a portion of the received trace data; and
provide at least one of the health statistic to a controller to adjust one or more parameters of the recipe based on the at least one health statistic.

17. The article of claim 16, wherein the instructions when executed enable the processor to determine a value associated with the overall health of the processing tool.

18. The article of claim 17, wherein the instructions when executed enable the processor to determine if the value associated with the overall health of the processing tool is greater than a pre-selected threshold value.

19. The article of claim 18, wherein the instructions when executed enable the processor to adjust the processing based on determining that the overall health of the processing tool is greater than the pre-selected threshold value.

20. The article of claim 19, wherein the instructions when executed enable the processor to provide a plurality of the health statistics to the controller to adjust one or more parameters of the recipe based on the health statistics.

21. An apparatus, comprising:
an interface; and
a controller communicatively coupled to the interface, the controller adapted to:
receive one or more health statistics associated with a processing tool that is under direction of the controller;
calculate at least one parameter of a recipe based on the one or more health statistics; and
cause processing of a wafer based on the at least one calculated recipe parameter.

22. The apparatus of claim 21, wherein the controller is adapted to receive an overall health value associated with the processing tool and cause the processing to be stopped if the overall health value is less than a pre-selected threshold value.

23. A system, comprising:
a processing tool adapted to provide trace data associated with a processing of a wafer of a lot;
a fault detection and classification system adapted to:
determine one or more health statistics associated with a health of a processing tool based on at least a portion of the trace data; and
provide the one or more health statistics to a controller; and
a controller for controlling the processing of the processing tool, the controller adapted to adjust the processing of a next wafer of the lot based on at least one of the health statistics.

24. The system of claim 23, wherein an advanced process control is coupled between the processing tools and the fault detection and classification system.

* * * * *